US012009903B2

United States Patent
Lucia et al.

(10) Patent No.: US 12,009,903 B2
(45) Date of Patent: Jun. 11, 2024

(54) ORBITAL EDGE COMPUTING

(71) Applicant: CARNEGIE MELLON UNIVERSITY, Pittsburgh, PA (US)

(72) Inventors: Brandon Lucia, Pittsburgh, PA (US); Bradley Denby, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 38 days.

(21) Appl. No.: 17/220,861

(22) Filed: Apr. 1, 2021

(65) Prior Publication Data

US 2021/0314058 A1    Oct. 7, 2021

Related U.S. Application Data

(60) Provisional application No. 63/003,371, filed on Apr. 1, 2020.

(51) Int. Cl.
| | |
|---|---|
| *G06F 11/36* | (2006.01) |
| *G06K 9/00* | (2022.01) |
| *G06Q 10/08* | (2023.01) |
| *H04B 7/185* | (2006.01) |

(52) U.S. Cl.
CPC ..... *H04B 7/18513* (2013.01); *H04B 7/18515* (2013.01)

(58) Field of Classification Search
CPC ............ H04B 7/18513; H04B 7/18515; H04B 1/3822; G06F 11/3696; G06F 11/3664; G06F 11/3688; G06F 11/3608; G06F 11/3684; G06K 9/0063; G01C 11/00; B64G 1/1021; G06Q 10/04; G05D 1/0011; H02J 9/00; H04W 84/20

USPC .......................................................... 370/316
See application file for complete search history.

(56) References Cited

U.S. PATENT DOCUMENTS

| | | | | |
|---|---|---|---|---|
| 5,392,451 | A  * | 2/1995 | Schwendeman | .... H04W 88/185 340/7.25 |
| 2002/0128770 | A1* | 9/2002 | Ooishi | ............. G08G 1/096775 340/988 |
| 2005/0038825 | A1* | 2/2005 | Tarabzouni | ............. G06F 16/29 |
| 2015/0149138 | A1* | 5/2015 | Lawrence | ............... E21B 43/12 703/9 |
| 2016/0147640 | A1* | 5/2016 | Huang | ................. G06F 11/008 717/130 |
| 2019/0068697 | A1* | 2/2019 | Darby, III | ............. G06F 9/5066 |
| 2019/0155716 | A1* | 5/2019 | Shin | ................... H04B 7/18517 |
| 2019/0197645 | A1* | 6/2019 | Varvarenko | ............ G06Q 50/30 |

(Continued)

OTHER PUBLICATIONS

Denby, Bradley, and Brandon Lucia. "Orbital edge computing: Machine inference in space." IEEE Computer Architecture Letters 18, No. 1 (2019): 59-62. (Year: 2019).*

(Continued)

*Primary Examiner* — Edan Orgad
*Assistant Examiner* — Vanneilian Lalchinthang
(74) *Attorney, Agent, or Firm* — Michael G. Monyok (57) ABSTRACT

A system and method of controlling a constellation of nanosatellites colocates processing resources with sensors in each satellite. Latencies in data transmission are addressed by organizing the constellation of satellites into computational pipelines. An orbital edge computing module simulates system design for mission design, planning and analysis in addition to supporting online autonomy.

11 Claims, 8 Drawing Sheets

(56) References Cited

U.S. PATENT DOCUMENTS

| | | | |
|---|---|---|---|
| 2020/0024001 A1* | 1/2020 | Nishiyama | B64G 3/00 |
| 2020/0160029 A1* | 5/2020 | Amselem | B64G 1/1021 |
| 2020/0278922 A1* | 9/2020 | Weiss | G06F 11/3688 |
| 2021/0011172 A1* | 1/2021 | Farley | H03M 1/1071 |
| 2021/0165930 A1* | 6/2021 | Lawrence | G06F 30/28 |
| 2021/0218150 A1* | 7/2021 | Mansour | H01Q 21/065 |

OTHER PUBLICATIONS

Denby, Bradley, and Brandon Lucia. "Orbital edge computing: Machine inference in space." IEEE Computer Architecture Letters 18, No. 1 (2019): 59-62.

Bandyopadhyay, S. et al. "Review of formation flying and constellation missions using nanosatellites." Journal of Spacecraft and Rockets 53, No. 3 (2016): 567-578.

Yost, Bruce. Small Spacecraft Technology State of the Art (2015).

Cappaert, Jeroen. "Building, deploying and operating a cubesat constellation-exploring the less obvious reasons space is hard." 32nd Annual AIAA/USU Conference on Small Satellites (2018).

Devaraj, K. et al. "Dove high speed downlink system." 31st Annual AIAA/USU Conference on Small Satellites (2017).

Frick, W. et al. "Small launch vehicles—a 2018 state of the industry survey." 32nd Annual AIAA/USU Conference on Small Satellites (2018).

Mehrparvar, A. et al. Cubesat design specification rev. 13. Technical report, California Polytechnic State University, San Luis Obispo, 2014.

\* cited by examiner

ORBITAL EDGE COMPUTING

CROSS-REFERENCE TO RELATED APPLICATIONS

This application claims the benefit under 35 U.S.C. § 119 of Provisional Application Ser. No. 63/003,371, filed Apr. 1, 2020, which is incorporated herein by reference.

STATEMENT REGARDING FEDERALLY SPONSORED RESEARCH

This invention was made with government support under award no. 1629196 awarded by the National Science Foundation. The government has certain rights in this invention.

BACKGROUND OF THE INVENTION

The present disclosure is related generally to satellites. More specifically, the disclosure is related to a system and method for operating a constellation of satellites with reduced demand for communication with ground stations.

Advances in nanosatellite technology and a declining cost of access to space have fostered an emergence of large constellations of sensor-equipped satellites in low-Earth orbit. Space system architects are eschewing large, costly (e.g. $650,000,000) satellites for constellations of small, inexpensive (e.g. $65,000 ea.) nanosatellites. Commercial efforts use this 10,000× lower per-device cost to deploy large, sensor-equipped nanosatellite constellations to low-Earth orbit and observe the planet with high temporal resolution. Such systems create new capabilities for precision agriculture, environmental and infrastructure monitoring, humanitarian assistance, and disaster relief, security, climate, and other commercial uses.

Many of these satellite systems operate under a "bent-pipe" architecture, in which ground stations send commands to orbit and satellites reply with raw data. A bent-pipe architecture for Earth-observing satellites breaks down as constellation population increases. Communication is limited by the physical configuration and constraints of the system over time, such as ground station location, nanosatellite antenna size, and energy harvested on orbit. The time-varying relationship between the geographic location of ground stations and the orbital position of nanosatellites imposes limitations on link availability and can lead to high downlink latencies. Intermittently available downlinks incur high latency between data collection and data processing in existing systems that simply downlink raw observations. Limits on downlink bitrate prevent bent pipes from scaling to accommodate the extreme data volumes of large constellations. Therefore, it would be advantageous to create a system architecture that permits large constellations of satellites with less reliance on communication with ground stations.

BRIEF SUMMARY

According to embodiments of the present disclosure is a system and method of operating a constellation of satellites, known as Orbital Edge Computing (OEC) architecture, which addresses the limitations of a bent-pipe architecture. The OEC system supports edge computing at each of a plurality of camera or sensor-equipped nanosatellites so that sensed data may be processed locally when downlinking is not possible. To address edge processing latencies, the OEC system can be used to organize satellite constellations into computational pipelines. These pipelines parallelize both data collection and data processing based on geographic location and without the need for cross-link coordination. OEC-managed satellites explicitly model constraints of the physical environment via a runtime service. This service uses orbit parameters, physical models, and ground station positions to trigger data collection, predict energy availability, and prepare for communication. The OEC architecture can reduce ground infrastructure over 24× compared to a bent-pipe architecture, and pipelines can reduce system edge processing latency over 617×.

DETAILED DESCRIPTION

According to embodiments of the disclosure is an Orbital Edge Computing (OEC) system 100, which can be used as an alternative to existing nanosatellite constellation bent-pipe architectures. The OEC system 100 co-locates processing hardware with high datarate spectral sensors in small, low-cost satellites 101. The physically-constrained design space of a computational nanosatellite 101 results in fundamental limitations on data quality and computation inherent to state-of-the-art designs. To address these limitations, the system 100 further comprises computational nanosatellite pipelines (CNPs) 200 as an organizational scheme for OEC constellations. A CNP 200 distributes sensing, processing, and communication across a constellation in order to remain within latency and energy envelopes. Stated differently, a CNP 200 organizes a constellation into a parallel pipeline to hide processing latency by leveraging formation flying techniques.

Figure 4:
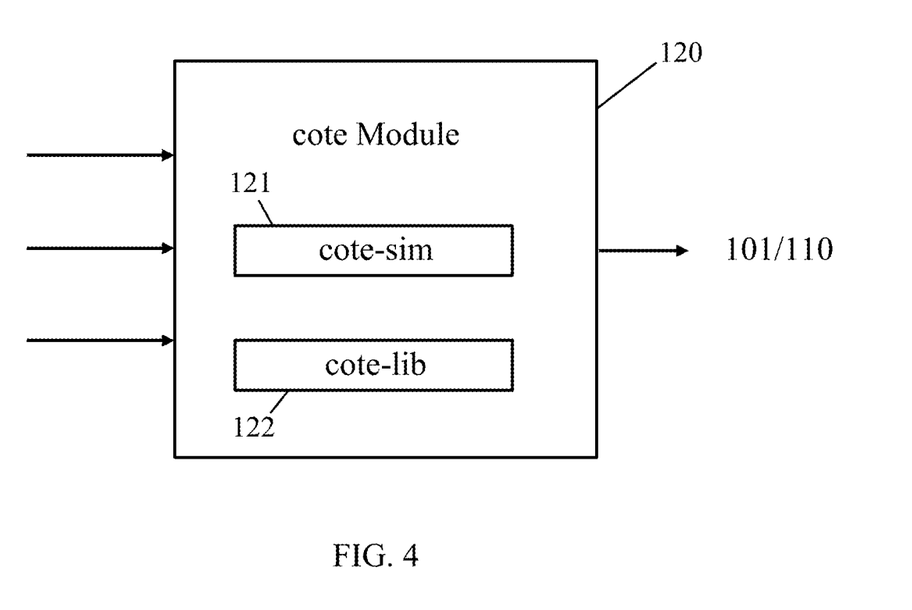
FIG. 4 is a diagram of a module of the system.

The system 100 further comprises a module 120 denoted as 'cote', comprising an orbital edge computing simulator (cote-sim) application 121 and runtime service (cote-lib) application 122. The cote module 120 physically models orbital mechanics and Earth rotation to track ground station 110 and satellite 101 positions over time. The cote module 120 models data collection along each satellite ground track, as well as the energy and latency of sensing, computing, and communication for an entire constellation. The cote module 120 is useful for mission design and simulation (cote-sim) and as an online runtime service for each nanosatellite 101 and ground station 110 (cote-lib). In one example embodiment, the module 120 comprises software adapted to perform the functions described. However, in alternative embodiments, the module 120 may comprise hardware, a microprocessor, a microcontroller, an application specific integrated circuit, a programmable logic array, a logic device, a digital signal processor, or other electronic hardware and software.

The cote-lib application 122 runs on each device in the OEC system 100 and provides continuous access to a physics-based model of the constellation and ground infrastructure to enable autonomy. By directly modeling the physics of the system 100, each satellite 101 determines at runtime when to downlink, when to process locally, and how to distribute responsibilities across a pipeline without the need for online coordination or cross-link communication. The cote-lib application 122 enables orbital edge computing by eliminating the reliance on remote control through a bent pipe.

Figure 1A:
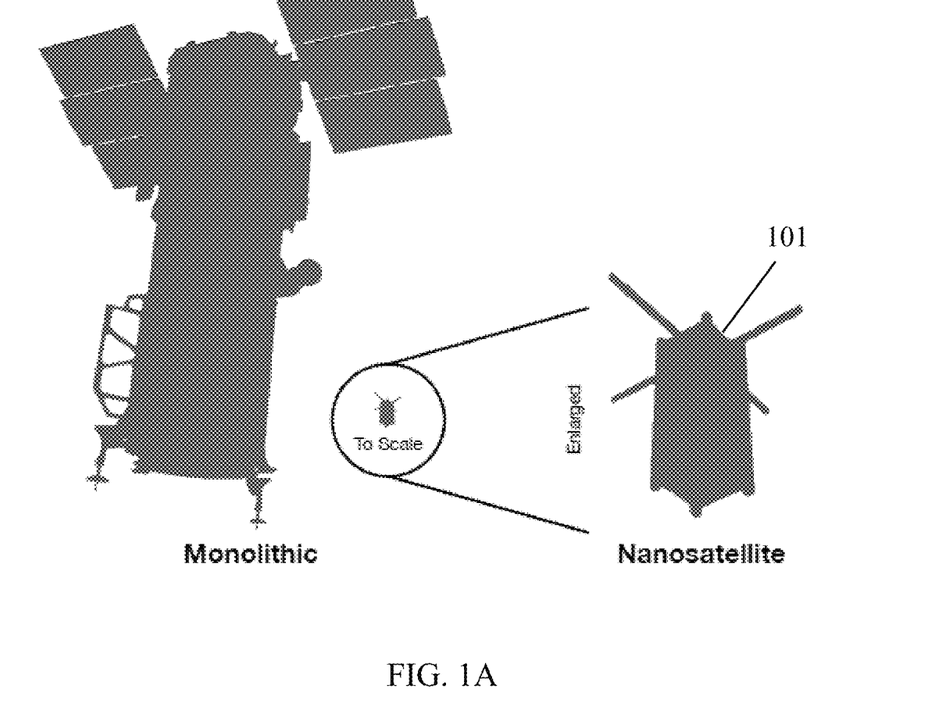
FIGS. 1A-1B show the system and system components, according to one embodiment.
Figure 1B:
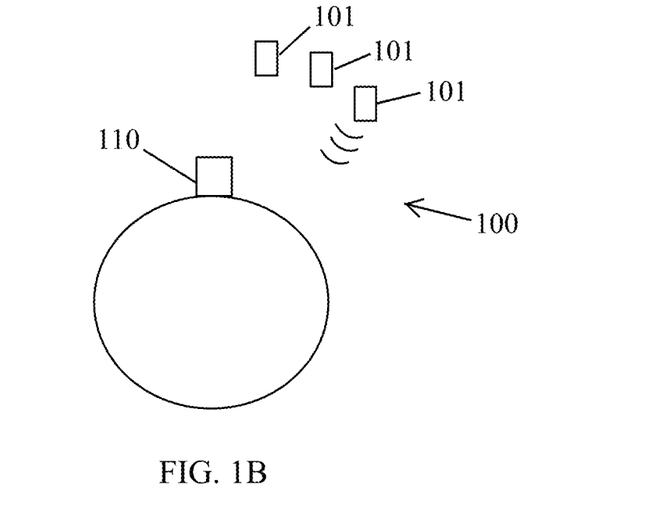

FIG. 1A depicts a nanosatellite 101 next to a traditional monolithic satellite, where the physical size difference is readily observable. A nanosatellite 101 has a mass between 1 kg and 10 kg, often adhering to the 'cubesat' standard to enable use of commercial, off-the-shelf (COTS) components and avoid custom deployers. A cubesat is a nanosatellite 101 physically constrained to 10 cm×10 cm×10 cm ("1U") volumes, with mass limited to 1.33 kg per 1U. This volume must house all sensors, actuators, and communication subsystems. Computers onboard existing nanosatellites 101 are simple, low-performance systems for command and data handling (C&DH), guidance navigation and control (GNC), buffering sensor data, and communication. Most nanosatellites 101 today rely on a ground control segment to manage data. FIG. 1B depicts a general overview of the system 100.

A nanosatellite electrical power system (EPS) collects, stores, and distributes energy. Many low-cost cubesats avoid higher-risk, deployable solar arrays and instead rely on surface-mounted solar panels. As a result, the small size of the satellite 101 constrains collected power to a few watts. Batteries must be small due to limited cubesat volume and mass. To prevent damage, batteries are heated in the cold of space (e.g. −40° C.), incurring a power cost overhead. Supercapacitor storage is less energy-dense, but has less mass, less volume, and avoids thermal issues; as a result, in one embodiment, the OEC system 100 utilizes supercapacitor energy storage for the nanosatellites 101.

A nanosatellite constellation is a collection of nanosatellites 101 that share a purpose, often a remote sensing task (e.g. imaging the Earth). Purposes can include data collection, data processing, or providing some other service such as communication, networking, connectivity, time keeping, or positioning. Examples of data collection include but are not limited to visual spectrum imagery, hyperspectral imagery, and infrared imagery of the Earth, orbital environment, or outer space; radio frequency samples, observations, and measurements; magnetic field sensing; measurements of gravity; collection and analysis of ions, atoms, molecules, and other particles; measurements of acceleration and velocity for position and orientation using accelerometers, gyroscopes, and other sensors; and many others. Example sensors include visual, hyperspectral, infrared, and other cameras specialized for other frequencies of light; radio transmitters and receivers at various frequencies; radar and lidar instruments; lasers; GPS/GNSS receivers; accelerometers; gyroscopes; magnetometers; sun sensors, star sensors, and Earth/Moon/planetary sensors; chemical and physical sensors; and many others capable of being deployed on a nanosatellite 101.

A constellation consists of a ground segment and a space segment. In bent-pipe architectures, the ground segment consists of geographically distributed, manually controlled transceivers, and the space segment consists of remote controlled satellites 101 in one or more orbits. In a traditional constellation, limited link availability and bitrate bottlenecks can cause reconfiguration of a constellation to take days, weeks, or months.

The OEC system 100 relies on computation satellites 101, which are capable of processing data at the point of collection. The design of a computational nanosatellite 101 is limited by three key challenges: physical constraints, orbit characteristics, and the relationship between orbit characteristics and ground station 110 location. As will be discussed in greater detail, the OEC system 100 minimizes the impact of these design challenges.

First, physical constraints (e.g. orbit altitude or volume limitations imposed by the cubesat standard) bound the achievable fidelity of visual data. Stated differently, the small physical size of a nanosatellite 101 limits visual sensor data quality. Satellite image quality is measured by ground sample distance (GSD), i.e. the geographic distance represented between centers of adjacent pixels. As GSD decreases, image quality increases. Commercial, monolithic systems have GSD as low as 0.3 m/px, while commercial nano-satellite systems have GSD around 3.0 m/px. Three parameters govern GSD: orbit altitude, camera focal length, and pixel sensor size. Many Earth-observing satellites optimize for low GSD.

Second, orbit characteristics determine data collection rate because satellite position and velocity dictate when and how often to capture data. The astrodynamics, or orbit characteristics, of a nanosatellite 101 determine the optimal rate at which to collect images. This rate must be both frequent enough to cover the entire ground track, and infrequent enough to avoid redundant data. A satellite 101 avoids collecting redundant images by making observations at the ground track frame rate (GTFR). The GTFR is the rate at which an entirely new geographic scene fills the camera view with no pixel overlapping a previous frame. The ground track frame period (GTFP) is the inverse of GTFR, i.e. the time a nanosatellite 101 takes to pass over one ground track frame. To minimize data volume, camera sensors need not capture frames at rates higher than the GTFR. In order to achieve sufficient coverage of a ground track, a satellite or constellation must capture images individually or in aggregate at the GTFR.

Third, the relationship between orbit characteristics, Earth rotation, and ground station 110 locations determines downlink availability, duration, and bitrate. Other systems may rely upon a large collection of ground stations 110 to provide a communications link for the orbiting satellites 101, although a large fraction of downlinked images contain no features of interest. The OEC system 100 reduces the need for a large number of ground stations 110 by processing images on orbit, downlinking only interesting images, and discarding or logging the rest. For example, assuming that machine inference identifies 0.75 GB of interesting data out of 15 GB of raw data, all data downlink in only 30 s at 200 Mbit/s. As a result, each ground station 110 supports 185 satellites, and a constellation of 1000 OEC satellites 101 requires only 6 ground stations 110.

The use of a computational satellite 101 permits near-sensor processing, permitting superfluous data to be discarded prior to downlink. As previously noted, a computational satellite 101 is adapted to process data at the point of collection and has several changes to its computing hardware and power system compared to a non-computational satellite. The hardware of a computational nanosatellite 101 supplements existing sensing, communication, and control hardware with onboard computing or data processing. In one example embodiment, the computational hardware comprises a Jetson TX2 industrial module. The Jetson TX2 module includes a high-capability, low-power, efficient mobile GPU and is designed for extreme temperature environments. A 7.5 W power mode of the hardware closely matches the 7.1 W input power provided by surface-mounted solar panels on the satellite. While a Jetson TX2 module is described in this example embodiment, the OEC system 100 supports other computing systems by varying input performance and energy parameters.

A computational nanosatellite 101 harvests and stores energy. Several types of energy systems can be used, including deployable solar cells and rechargeable batteries. In one embodiment, the energy harvester is a low-risk, chassis-mounted solar cell array that avoids the mechanical complexity of deployable panels. A chassis-mounted array limits total solar cell area and, as a result, available power peaks at about 7.1 W. A high-density supercapacitor bank stores energy. Supercapacitors hold less total energy than batteries of the same volume, but charge quickly and provide immediate, high current. Moreover, supercapacitors operate across the wide range of temperatures in space, while batteries fail in excessive heat or cold. The OEC system 100 operates as an intermittent system, harvesting energy while sleeping to charge its capacitors. When energy is sufficient, it performs its sensing, computing, or communication task during an active phase.

A computational nanosatellite 101 operates by capturing an image or other data and processing it locally instead of transmitting it to Earth through a bent-pipe. The application determines the processing method. Examples include CNN-based image classification, object detection, and segmentation, or any other computation; in one embodiment, the OEC system 100 includes onboard machine inference. A typical OEC processing task identifies features of interest, separating them from raw sensor data. An OEC system discards uninteresting data and sends processed features of interest to Earth, using intelligent early discard as such process is known in the art.

As previously discussed, the OEC system 100 can be energy and latency constrained. While processing a frame (such as an image frame from an image sensor), a nanosatellite 101 can capture but not process additional frames. Further, a nanosatellite 101 cannot capture a frame while sleeping. As a result, the OEC system 100 leverages the constellation as a whole to overcome energy and latency constraints.

Figure 2:
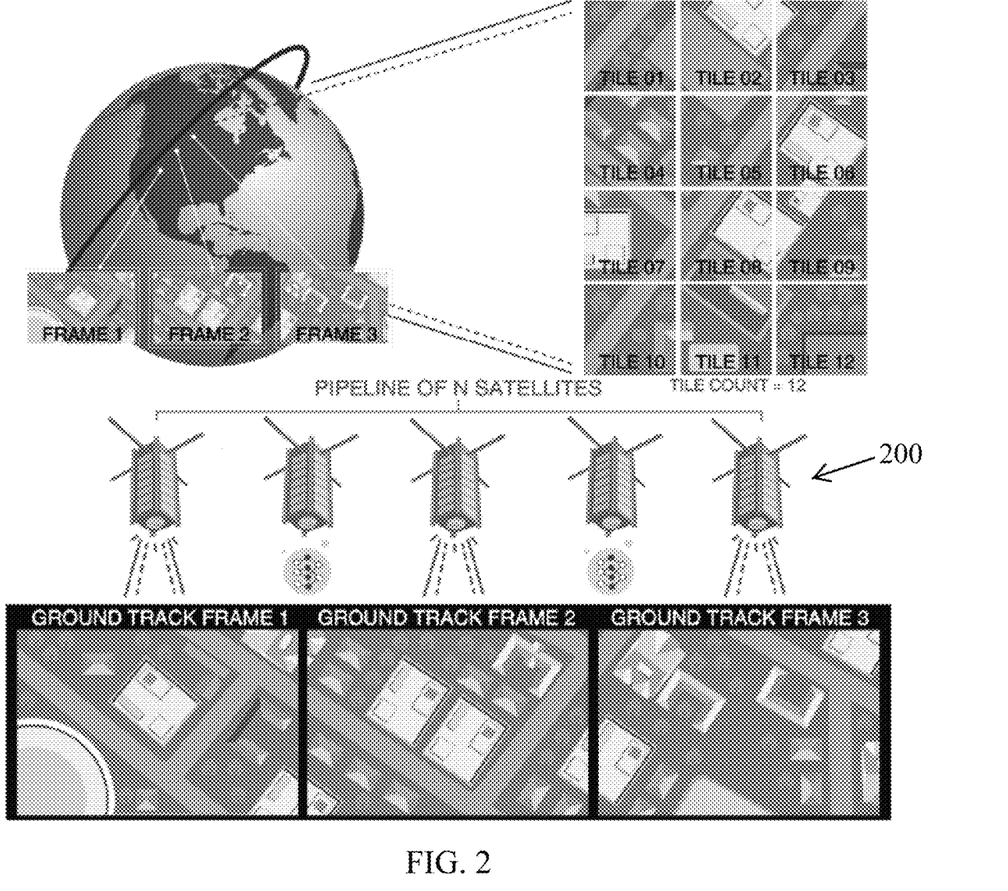
FIG. 2 is a diagram showing data frames/tiles for a pipeline configuration, according to one embodiment.
Figure 3A:
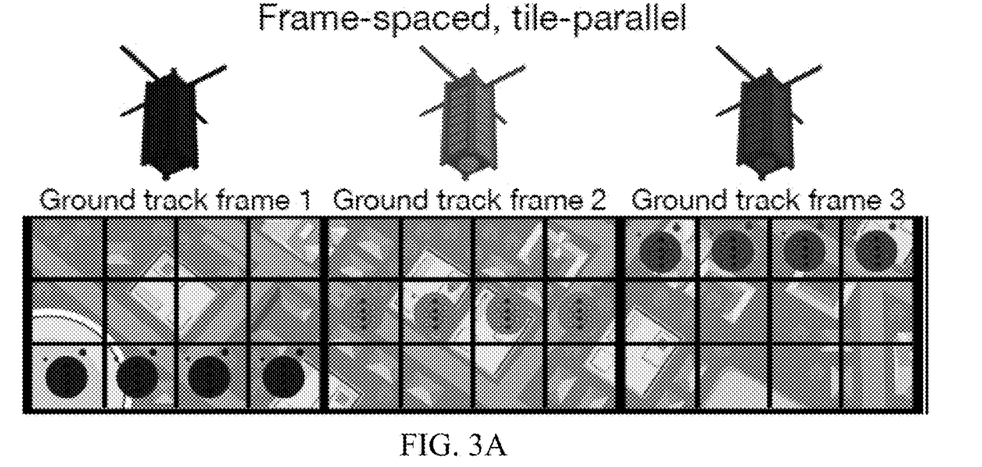
FIGS. 3A-3D is a diagram depicting various pipeline configurations.
Figure 3B:
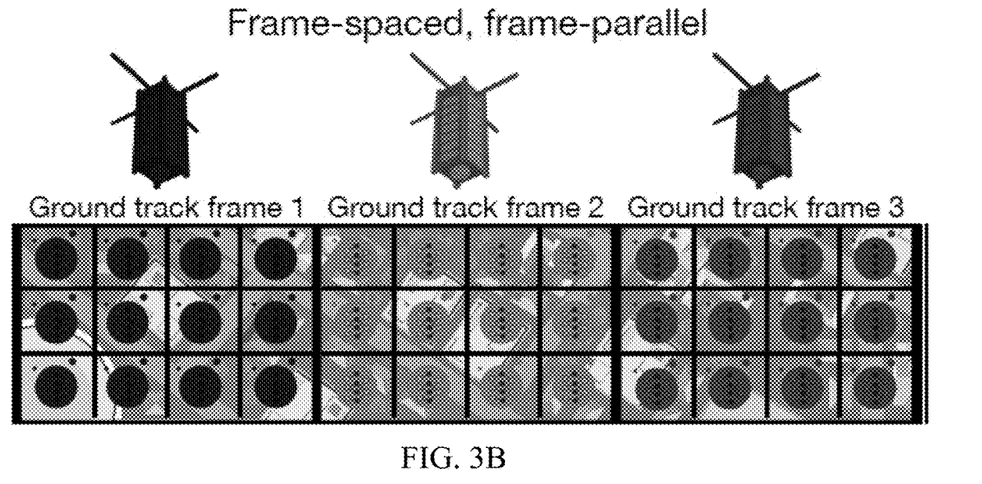
Figure 3C:
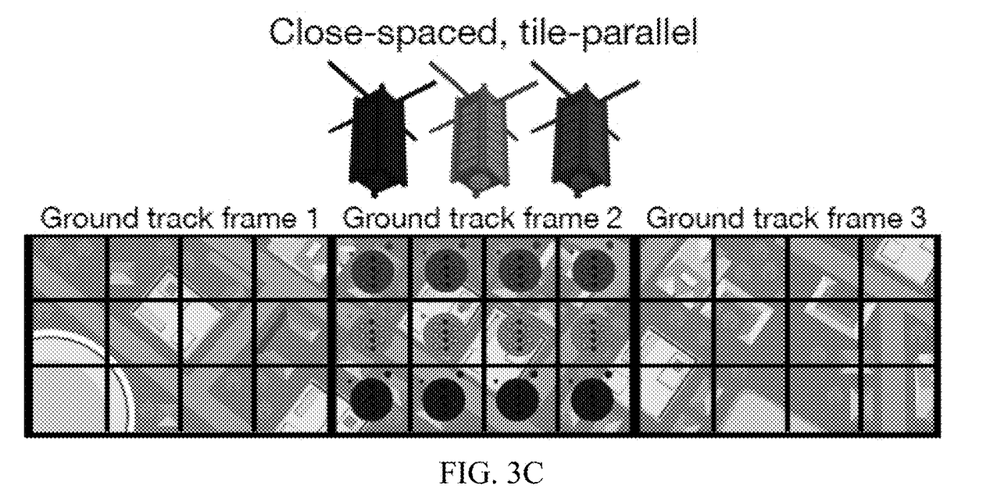
Figure 3D:
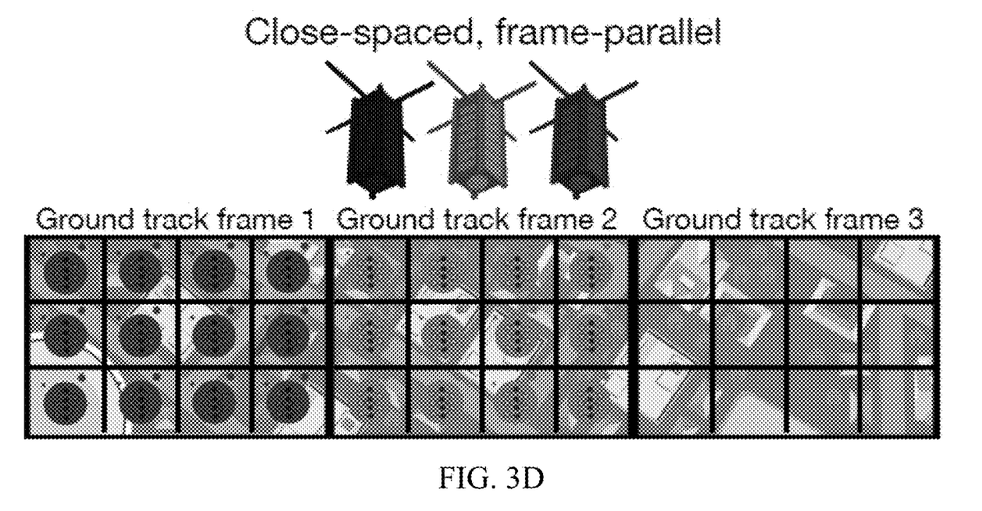

A constellation of OEC nanosatellites overcomes the energy and latency limitations of individual satellites by organizing them into the CNP 200. The pipeline 200 leverages existing formation flying techniques to orbit in a fixed configuration, parallelizing data collection and processing across a constellation. CNPs 200 divide image frames into tiles; in some modes, tile processing is distributed among satellites 101 to reduce system-level frame processing latency. A tile is any subset of data from the image. For example, a subset of pixels in an image is a tile. FIG. 2 (original 4) illustrates a CNP 200 operating on ground track frames, which are tiled during processing. As shown in FIG. 2, the orbit determines the ground track (i.e. the locations over which a satellite passes). A ground track can be separated into a sequence of ground track frames. In some embodiments, each frame is tiled before processing. In the pipeline 200 shown in the bottom of FIG. 2, a satellite 101 images a ground track frame and performs processing until arriving over the next frame.

The CNPs 200 of the OEC system 100 can takes several forms: frame-spaced/tile-parallel; frame-spaced/frame-parallel; close-spaced/tile-parallel; and close-spaced/frame-parallel. FIGS. 3A-3D illustrates each of these modes. Each graph depicts a snapshot in time. In the next time step, each satellite 101 will have progressed one ground track frame to the right. Frame-parallel and tile-parallel describe how image processing tasks are distributed across a CNP 200. Under frame-parallel processing, each nanosatellite processes all tiles in each captured frame. Under tile-parallel processing, each nanosatellite processes a subset of tiles in each captured frame. Frame-spaced and close-spaced describe the physical configuration of the satellites 101 within a CNP 200. A frame-spaced pipeline places each nanosatellite 101 exactly one GTF apart in distance. A close-spaced pipeline 200 places each nanosatellite 101 as close together as is feasible, e.g. meters or tens of meters apart, with a requirement that the end-to-end pipeline distance is less than the length of one GTF.

A frame-spaced/tile-parallel pipeline 200 separates devices by one GTF in distance; each device images every GTF (so long as there is sufficient energy) and processes a subset of tiles. A frame-spaced, frame-parallel pipeline 200 also separates devices by one GTF in distance; each device images a distinct subset of GTFs and processes all tiles in the frame. A close-spaced, tile-parallel CNP 200 places devices close together in distance; each device images every GTF and processes a subset of tiles. A close-spaced, frame-parallel CNP 200 also places devices close together in distance; each device images a distinct subset of GTFs and processes all tiles in the frame. An orbit-spaced constellation, in which satellites 101 are evenly distributed across an orbit, is a modified version of a frame-spaced constellation offering improved communication opportunities. Station-keeping, which allows a nanosatellite 101 convoy to maintain consistent distances between adjacent devices (e.g. frame-spaced, close-spaced), requires formation flying techniques to compensate for atmospheric drag and other astrodynamic effects.

The number of devices in a CNP 200, or pipeline depth, increases the aggregate parallel work performed and the aggregate energy collected. Pipeline depth does not affect total data per revolution, because the number of frames per orbit remains constant. For example, the period (time duration) of a single orbit revolution remains constant so long as the orbit characteristics (e.g. the Keplerian elements) remain unchanged. Each satellite revolution corresponds to a ground track, which is the sequence of points on the surface of the Earth directly below the satellite (the subpoint latitude and longitude) as the satellite 101 traverses its revolution. When the period of the revolution remains unchanged, and the rotation of the Earth remains unchanged, the length of the ground track will remain unchanged between revolutions. This constant-length ground track can be partitioned into a sequence of images, resulting in a constant number of frames per revolution.

When the aggregate energy harvested by a CNP 200 is less than the aggregate energy required to process all data, adding devices increases coverage (the fraction of GTFs captured per revolution) by increasing total system energy per revolution. When the aggregate energy harvested by a CNP 200 is enough to process all data, a CNP 200 may achieve full coverage. However, such a pipeline 200 may still fall short of full coverage due to processing latency. If there are too few nanosatellites 101 to complete parallel processing of all frames in one revolution, then coverage remains incomplete. Adding devices to the pipeline increases parallelism and decreases latency, eventually yielding a system capable of full coverage.

To ensure a proper spacing between satellites 101 in a constellation, a computational nanosatellite pipeline may require propulsion and positioning. Unlike uncontrolled constellation configurations, formation flying may require each nanosatellite 101 to have a propulsion system to correct for drag. A variety of nanosatellite propulsion systems are known in the art, including cold gas, liquid, ion thrusters, and hall effect propulsion systems.

To avoid the complications and expense of cross-link satellite communication, each device independently triggers camera captures based on position. The predetermined orbit and formation of a CNP 200 allows capture coordinates to be defined before launch. Contemporary navigation constellation receivers track position with milliwatts of power, and they can be unlocked for high-velocity, high-altitude use in space.

The computational satellites in the OEC system 100 do not rely on instructions from ground stations 110 to initiate sensing or downlinking operations. Thus, to minimize communications with ground stations 110, the computational satellites actions are self-determined using the cote module 120. The cote module 120 comprises two applications, cote-sim 121 and cote-lib 122, and provides a full-system model for orbital edge computing. In one embodiment, the cote module 120 comprises software installed on the computational satellite 101 and/or ground station 110. A diagram of the cote module 120, comprising the cote-sim application 121 and cote-lib application 122, is depicted in FIG. 4.

The cote module 120 provides a detailed, physical simulation of the OEC system 100 through an analytical model of orbital mechanics, the time-evolution of celestial and terrestrial coordinate frames, and physical bounds on communication bitrates, as well as a discrete-time model for harvested and buffered energy, sensing, data storage, and computing. These core components are shared across two applications: cote-sim 121 and cote-lib 122. cote-sim 121 supports OEC system 100 design through pre-mission simulation, and cote-lib 122 supports dynamic, online autonomy at the edge.

The cote-sim application 121 provides offline simulation of the OEC system 100 for mission design, planning, and analysis. cote-sim 121 supports modeling interactions between energy-constrained, intermittent computing, computational nanosatellite pipeline configurations, data collection at the GTFR, and communication. cote-sim 121 fills integrates computing, communication, and energy as first-class counterparts to space mission dynamics.

The cote-lib application 122 supports online autonomy, continuously running on each device in an OEC system 100. cote-lib comprises an online nanosatellite software system that models the interaction between astrodynamics and intermittent computing to autonomously decide when to compute locally and when to communicate. cote-lib 122 integrates space mission dynamics into an edge computing runtime system, enabling autonomous control at the orbital edge.

The cote-lib application 122 runs continuously in the background on an OEC device, explicitly modeling ground station 110 availability. cote-lib 122 estimates latency and energy collection given input power and computing workload parameters. When an OEC satellite 101 collects an image, it leverages cote-lib 122 to determine whether to process an image locally or to transmit raw data to the ground. Thus, the cote-lib application 122 enables an OEC satellite 101 to adapt to changing orbit and power conditions in real-time, providing fine-grained adaptation.

In one embodiment, the cote module 120 integrates standard, analytical models of astrodynamics with discrete-time models for edge computing. For example, an OEC system 100 deployed to LEO for Earth observation should be aware of time. While orbits are periodic, typically completing one LEO revolution in about 90 minutes, several factors make each revolution unique. Over the course of one revolution, the Earth rotates more than 22.5°. Due to the oblateness of the Earth, the orbit longitude of the ascending node precesses. Additionally, the Earth advances through its revolution around the Sun. Although a satellite returns to the same true anomaly value after each revolution, system conditions change. Distances to nearby ground stations 110 shift, and the amount of harvestable energy changes with the relative position of the Sun. These changes can be modeled and predicted by plotting them within a system of time.

In addition to time, an OEC system 100 deployed to LEO for Earth observation should be aware of position. The position of an Earth-observation satellite determines which data can be collected and whether communication channels are available. The cote module 120 supports three coordinate frames: the Earth-centered, inertial (ECI) frame, the latitude, longitude, and height above the ellipsoid (LLH) frame, and the south, east, z (SEZ) frame.

The origin of the ECI frame is located at Earth's center, i.e. the intersection of the north-south axis and the equatorial plane. The positive x-axis points toward the vernal equinox, the positive z-axis points toward the north pole, and the positive y-axis completes the right-handed Cartesian coordinate frame. The cote module 120 uses the ECI frame as the fundamental, universal coordinate frame.

The LLH frame, which is well-known due to widespread use of latitude and longitude, is tied to the reference ellipsoid defined in the World Geodetic System 1984 (WGS84) (most recently updated in 2014) and, optionally, the World Geodetic System 1972 (WGS72) for backwards compatibility. Ground station 110 operations use the SEZ frame which, like the LLH frame, is non-inertial and rotates with the Earth. Axes point south, east, and up (normal to the local ellipsoid surface). The cote module 120 uses standard transformations for the azimuth and elevation of satellites in SEZ. The cote module 120 uses the great circle arc on the celestial sphere as the measure of distance between satellites 101 in the ground station 110 frame.

Orbital Mechanics—Given a model of time and position, orbital mechanics provides a means for modeling the state of a satellite 101 relative to a rotating Earth. In one embodiment, the cote module 120 uses the de facto standard simplified general perturbation model (SGP4) as its orbital mechanics engine. The SGP4 model comprises a collection of analytical equations tailored for Earth orbit. These analytical equations are seeded with a set of empirically determined measurements provided as two-line element sets (TLEs). Unlike more general, but less detailed, physics models, SGP4 is able to capture the effects of atmospheric drag through the empirical nature of the TLEs.

Communication—The utility of OEC system 100 stems from the communication bottleneck between the space segment and the ground segment as constellation population increases. The cote module 120 models the maximum achievable bitrate under received signal power for downlink, crosslink, and uplink channels Energy—In order to study the impact of data collection and computing on system energy, an analytical model for energy harvesting, storage, and consumption is used in the cote module 120. For energy harvesting, a simple solar cell can be modeled at its maximum power point with an I-V curve consisting of the device short-circuit current at open-circuit voltage. For energy storage, a capacitor bank and its equivalent series resistance (ESR) can be modeled. In one embodiment, the modeled load includes a Jetson TX2 module, a camera system, and an ADACS, each represented as variable resistors consuming energy over time as determined by the power mode at each time step. The power consumption of the TX2 module varies depending on the computation, while the power consumption of the camera varies depending on whether an image is being captured or read out for analysis. The simulations provided by the cote-sim application 121 produce a time series of events and measurements, including device current and voltage at the granularity of the simulation time step and power state transition events. Under the simple solar cell model described previously, an energy-harvesting, storage, and consumption system can be modeled overtime.

The cote-sim application 121 can be used to simulate the various CNP 200 configurations and evaluate OEC latency per ground track frame, i.e. the time between frame capture and completion of frame analysis. This latency varies with parallelization across a constellation and physical distance between nanosatellites 101 in a CNP 200. System latency determines the geographic location at which frame processing completes—an important factor when satellites 101 can transmit results only when in range of a ground station 110.

Figure 5:
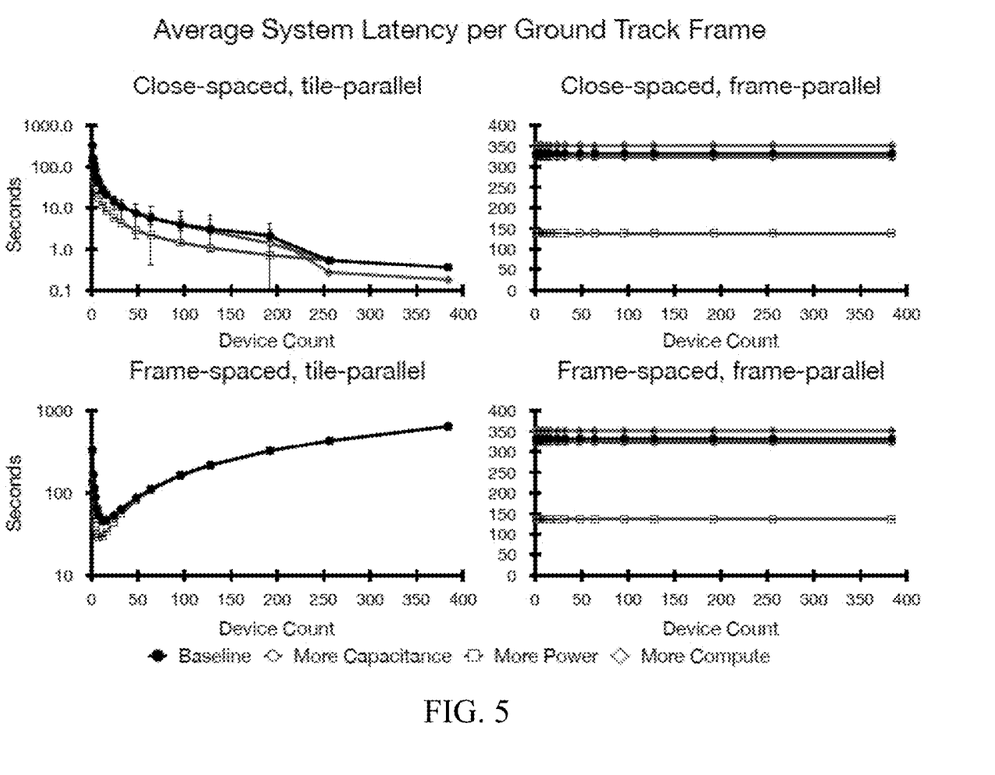
FIG. 5 is a set of graphs depicting the performance of computational nanosatellite pipeline configurations.

As shown in FIG. 5, the system characteristics of frame-parallel CNPs 200 are identical regardless of whether satellites 101 are frame-spaced or close-spaced. This fact is visible in FIG. 5, right, by comparing the close-spaced, frame-parallel plot with the frame-spaced, frame-parallel plot. Tile-parallel processing decreases system latency in close-space constellations. Improvements disappear when satellites 101 are frame-spaced. As shown on the graph on the right of FIG. 5, system latency is high with frame-parallel processing, but latency no longer depends on constellation configuration. In a frame-parallel CNP, the complexity of close-spaced formation flying provides no benefit over an uncoordinated, frame-spaced configuration. Once each satellite 101 has been assigned its GTFs, relative drift between devices does not impact GTF latency. However, the benefit of not requiring formation flying is tempered by uniformly high GTF latencies. Once the CNP pipeline is full, a new frame is completed every GITP. Nevertheless, processing has long latency and the geographic location at which a particular GTF completes processing is far from the original observation location.

FIG. 5, left, shows that tile-parallel CNPs 200 require a close-spaced configuration to maintain low per-GTF latency. When devices are close-spaced, work is distributed among satellites 101 and all tiles are processed shortly after all satellites 101 observe a frame. However, frame-spaced satellites 101 have high per-GTF latency with deeper pipelines. This effect emerges because, in a tile-parallel configuration, the satellite 101 responsible for processing the last subset of tiles captures the frame long after the first satellite 101 captures the frame. This effect is magnified in an orbit-spaced configuration. The data show that a close-spaced configuration reduces latency over 617x.

Figure 6:
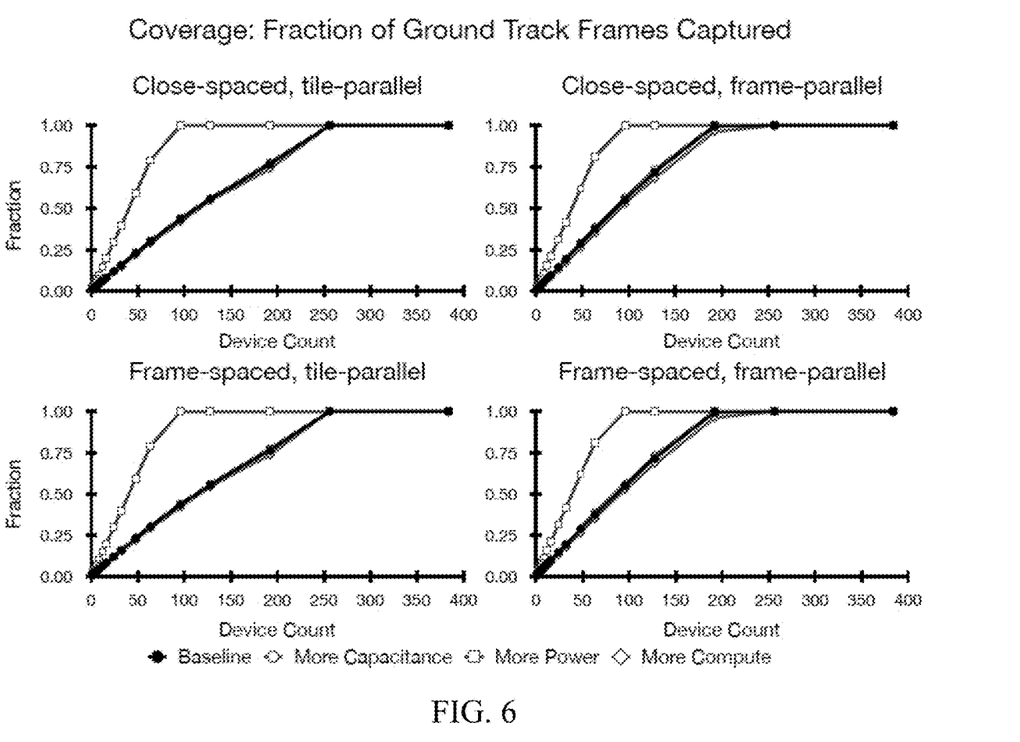
FIG. 6 is a set of graphs showing coverage as a function of pipeline depth for several pipeline configurations.

The cote-sim application 121 can also be used to evaluate OEC ground track coverage, i.e. the fraction of GTFs captured per revolution. Aggregate energy collected across a CNP limits coverage. As device count increases, a pipeline 200 achieves the minimum computing capability needed for full coverage before collecting sufficient aggregate energy to process all frames. FIG. 6 plots coverage as a function of pipeline depth (i.e. device count). Each plot lists four series: the baseline configuration, and the configurations with increased energy buffering, energy harvesting, and computing. Due to the energy-constrained nature of this design point, increasing solar panel surface area increases coverage at a faster rate than other parameters. While "more power" supports full coverage with a shorter pipeline, this configuration depends on a complex, mechanically-deployed solar array that increases system cost and risks a catastrophic deployer failure.

Under frame-parallel operation, individual satellites 101 collect a GTF and process all tiles, which means that all GTFs are imaged exactly once across the CNP system. As a result, the number of times that any camera is activated across the CNP system matches the number of ground track frames as coverage approaches 100%. In tile-parallel operation, every satellite 101 images each GTE Thus, the number of times that cameras are activated across the CNP system is equal to the pipeline depth times the number of GTFs. However, the overall energy effect of more frequent camera use at the system level is small because camera energy is four orders of magnitude less than compute energy. The effect of more frequent camera activation manifests as a lower slope in the tile-parallel graphs compared to the frame-parallel graphs as coverage approaches 100%. In FIG. 6, the slopes in the tile-parallel configurations are less steep than the slopes in the frame-parallel configurations.

The data show that for object detection, full coverage of the ground track is feasible under multiple configurations, requiring around 100 satellites with deployable solar panels and around 250 satellites with surface-mounted panels. Existing nanosatellite constellations contain more than 200 devices, which means that OEC pipeline depths achieving full coverage are feasible. Increasing solar panel surface area dramatically reduces pipeline depth at the expense of greater engineering complexity (deployable panels) and higher per-device cost. Coverage degrades gracefully as pipeline depth decreases.

Figure 7:
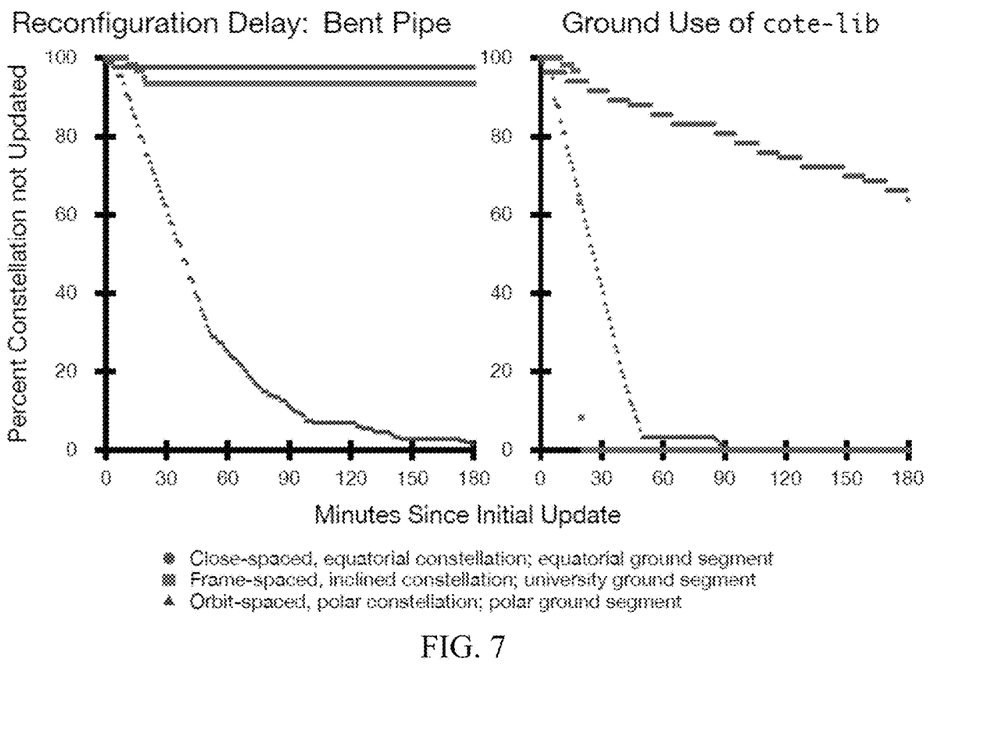
FIG. 7 is a set of graphs of system performance.

FIG. 7 shows that that the cote-lib application 122 improves existing ground systems by enabling link-schedule policies that prioritize communication to nanosatellites 101 with the largest amount of data to communicate, instead of heuristic policies that instead optimize for signal strength. Rather than a ground station 110 forgoing valuable downlink opportunities to upload link schedules, an OEC nanosatellite 101 uses the cote-lib application 122 to model the state of the entire constellation. With knowledge of the link-schedule policy, each nanosatellite 101 generates upcoming communication events on orbit.

FIG. 7 further shows reconfiguration times with and without the cote-lib application 122. At right, cote-lib 122 augments existing ground segments by enabling a more advanced link-schedule policy prioritizing satellites 101 with the largest amount of buffered data. Ground use of cote-lib 122 reduces reconfiguration times, but constellations of tens to hundreds of devices often require multiple revolutions before the entire system reconfigures. During this time, the constellation misses thousands of GTFs. cote-lib 122 avoids lengthy reconfiguration times. By running continuously in the background on an OEC satellite 101, computing and communication decisions can be made autonomously on orbit.

While the examples so far have focused on nanosatellite constellations that share a single orbit and a single workload, the OEC system 100 can be applied to heterogeneous systems and heterogeneous workloads. For example, a constellation operator may wish to serve many different clients over time. Clients will be interested in different features at different scales. As a result, different orbit altitudes and different hardware will be better suited to different clients. Supporting a dynamic set of workloads from a dynamic set of clients can be accomplished using the cote module, for example, especially with regards to constellation reconfiguration. The high overhead of uplinking new ML models could be offset with federated learning techniques. The OEC system 100 can also be used to control satellites that are even smaller than nanosatellites. Chip-scale or gram-scale satellites ("chipsats") can be deployed more numerously and at even lower cost. Such devices are even more attritable than nanosatellites, but the smaller size places even tighter constraints on capability, making the cote module and OEC system 100 more valuable.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. In particular, one or more features in any of the embodiments described herein may be combined with one or more features from any other embodiments described herein.

Protection may also be sought for any features disclosed in any one or more published documents referred to and/or incorporated by reference in combination with the present disclosure.

What is claimed is:

1. An orbital edge computing system for controlling a constellation of satellites comprising:
    a plurality of computational satellites forming a constellation,
        wherein each computational satellite of the constellation comprises a sensor and is configured to process data collected from the sensor,
        wherein the constellation forms a computational nanosatellite pipeline;
    a cote module present on each computational satellite of the plurality of computational satellites, the cote module comprising a simulation application and a runtime application,
        wherein the simulation application models interactions between computational nanosatellite pipeline configurations, data collection, and communication; and
    a ground station capable of intermittently communicating with a computational satellite in the constellation,
        wherein each computational satellite of the plurality of computational satellites initiates a process of utilizing the sensor or communicating with the ground station autonomously using the cote module.

2. The system of claim 1, wherein each computational satellite of the constellation is an intermittent computing system having sleep and active cycles.

3. The system of claim 1, wherein each computational satellite of the constellation is powered by a supercapacitor charged by at least one solar array.

4. The system of claim 1, wherein the computational nanosatellite pipeline is selected from a group consisting of frame-spaced/tile-parallel; frame-spaced/frame-parallel; close-spaced/tile-parallel; and close-spaced/frame-parallel.

5. The system of claim 1, wherein the runtime application models constraints of the physical environment via a runtime service.

6. The system of claim 5, wherein the physical environment constraints comprise orbit parameters, physical models, and positions of the ground station.

7. The system of claim 5, wherein the runtime application is used to trigger data collection, predict energy availability, and prepare for communication with the ground station.

8. The system of claim 1, wherein the runtime service produces a link-schedule policy to prioritize communication between the ground station and a satellite of the constellation with a largest amount of data to communicate.

9. The system of claim 1, wherein each computational satellite of the plurality of computational satellites initiates the process of utilizing the sensor or communicating with the ground station without receiving instructions from the ground station.

10. The system of claim 1, wherein each computational satellite of the plurality of computational satellites utilizes the cote module to determine whether to process the data collected from the sensor locally or to communicate the data to the ground station.

11. The system of claim 1, wherein a first computational satellite of the plurality of computational satellites utilizes the cote module to determine how to distribute a responsibility to a second computational nanosatellite without communication to the ground station or to the second computational satellite.

* * * * *